Sept. 28, 1954
R. J. ALTGELT ET AL
2,690,113
FLOATING EARTHWORKING ELEMENT FOR IMPLEMENTS
Filed May 8, 1951
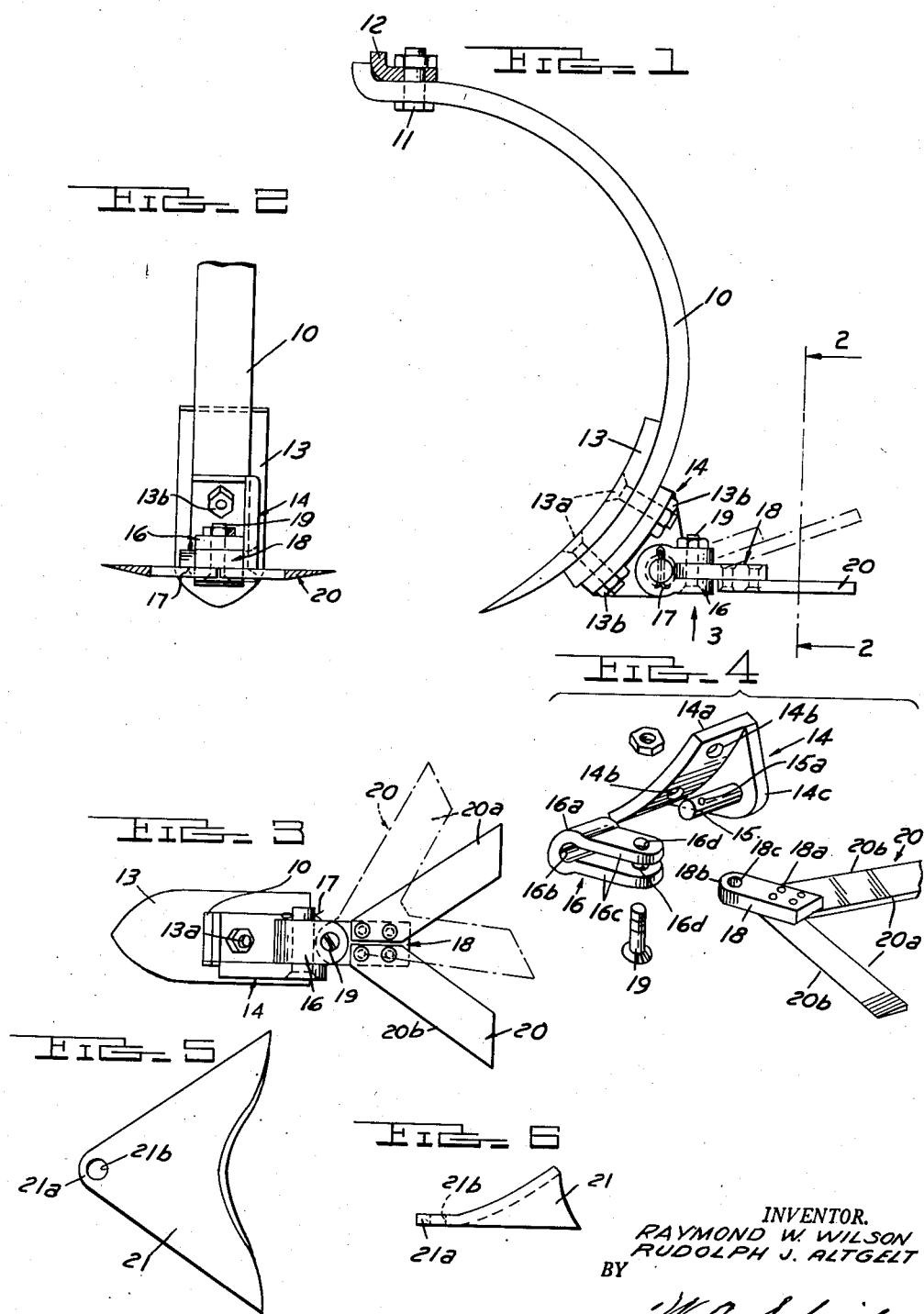
INVENTOR.
RAYMOND W. WILSON
RUDOLPH J. ALTGELT
BY
W. A. Schaich
ATTORNEY Patented Sept. 28, 1954

2,690,113

UNITED STATES PATENT OFFICE 2,690,113

FLOATING EARTHWORKING ELEMENT FOR IMPLEMENTS

Rudolph J. Altgelt, South Bend, Ind., and Raymond W. Wilson, Ferndale, Mich., assignors, by mesne assignments, to Ford Motor Company, Dearborn, Mich., a corporation of Delaware Application May 8, 1951, Serial No. 225,172

1 Claim. (Cl. 97—205)

This invention relates to a floating earth working element for implements and particularly to an earth working element for ground burdened with obstructions.

Tilling or cultivating stony ground and so-called "dry land" presents problems not ordinarily encountered in what is considered the better farming areas of the country. When using conventional cultivating implements or the so-called stubble mulch plows in stony ground, the earth working elements of such implements frequently lodge behind stones thereby causing breakage of the earth working elements or otherwise damaging the implement. If no damage is incurred by the implement, the normal cultivating or tilling operation is interrupted by either a lateral or vertical deviation of the implement usually resulting in physical damage to the crops or insufficient weed destruction.

In dry land plowing or cultivating, it is desirable that the top surface of the soil be disturbed as little as possible in order that excessive drying of the soil be prevented. It is also being advocated in such dry regions, as well as in the more northerly portions of the country, that the surface of the soil should preferably be covered with vegetable refuse in the form of leaves or plant stalks to protect the soil as well as to retain surface water both in winter and in summer. Tilling the soil with conventional moldboard plows, however, buries the leaves and stalks thereby defeating the desired end. Another unfortunate result of plowing with a moldboard plow is that the subsurface of the soil is left in a firmed hard condition which makes it exceedingly difficult for the roots of various crops such as wheat and corn to penetrate it.

It is, therefore, an object of this invention to provide an improved earth working element for improved preparation or cultivation of the soil in dry or stony ground.

A further object of this invention is to provide a floating earth working element for implements which is unusually effective in breaking up the hard plow pan produced by moldboard plows.

The specific nature of this invention, as well as other objects and advantages thereof, will become apparent to those skilled in the art from the following detailed description, taken in conjunction with the one sheet of drawings on which, by way of preferred example only, is illustrated several embodiments of this invention.

On the drawings:

Fig. 1 is a side elevational view of the improved floating earth working element constructed in accordance with this invention shown mounted on an implement tine.

Fig. 2 is a sectional view encompassed by the plane 2—2 of Fig. 1.

Fig. 3 is a bottom view of Fig. 1.

Fig. 4 is an exploded perspective view showing the elements used for pivotally mounting the earth working element to the tine of Fig. 1.

Fig. 5 is a plan view of a modified sweep.

Fig. 6 is a side elevation of Fig. 5.

As shown on the drawings:

The improved floating earth working element of this invention may be utilized with a wide variety of cultivating type implements or it may be used for seed bed preparation in lieu of plowing, particularly when tilling soil in dry land areas or where a minimum of surface disturbance is required as in stubble mulch farming. Its use may also be extended to cultivating row crops and other crops. In any event, such element may be readily attached to the tool bars or tines of such implements without the expense of providing an entirely new implement in order to utilize this improved earth working element.

Accordingly, there is shown in Fig. 1 the depending tine or standard 10 of a cultivating or tilling implement. Tine or standard 10 is arcuately shaped and has its upper end secured by a bolt 11 to a transverse implement attaching bar 12. The lower end of tine 10 curves forwardly and has a chisel point 13, of well-known construction, secured by a pair of bolts 13a to the forward face of such tine at its lower extremity.

A mounting bracket 14 is secured to the back of the lower extremity of tine 10, as best shown in Fig. 1, so that an earth working element 20 can be attached thereto. Bracket 14 comprises an arcuate plate 14a shaped to snugly fit against the rear surface of tine 10. Plate 14a has a pair of spaced apertures 14b through which the pair of bolts 13a are respectively inserted. Nuts 13b screwed on to the ends of bolts 13a secure plate 14a to the rear side of tine 10. Plate 14a has a substantially triangularly shaped lug 14c, integral therewith, or secured by welding to the back side thereof. Lug 14c is secured adjacent a longitudinal edge of plate 14a as best shown in Fig. 4. A pin 15 is suitably secured within a transverse aperture (not shown) in lug 14c, and pin 15 underlies plate 14a as best shown in Figs. 3 and 4.

A clevis 16 comprises a U-shaped member having a rounded end 16a which defines a substantially cylindrical hole 16b. The legs 16c of clevis 16 are spaced apart for a reason to be presently explained and the forward ends of legs 16c have vertically aligned apertures 16d. Clevis 16 is mounted on transverse pin 15, cylindrical hole 16b permitting such assembly. Pin 15 has a transverse hole 15a near the outer extremity thereof through which is inserted a cotter pin 17 to pivotally secure clevis 16 to such pin.

The earth working element 20 can partake of the shape of any one of a plurality of well-known sweeps, blades or shovels, and is illustrated as comprising a pair of wedge shaped blades 20a. Blades 20a are secured by a plurality of bolts 18a to the under side of a rectangular mounting block 18. Blades 20a are arranged in generally V-shaped configuration on such block and the wedge shape of such blades define soil cutting edges 20b. The forward end of mounting block 18 is rounded, as shown at 18b, and such rounded end has a vertical aperture 18c. A bolt 19 insertable through aligned apertures 16d in clevis 16 and through aperture 18c in mounting block 18 pivotally mounts earth working element 20 for sidewise swinging movement on the bracket 14. Clevis 16 also permits freely vertical swinging movement of the earth working element 20.

A modified form of earth working tool 21 is shown in Figs. 5 and 6. The earth working tool 21 more nearly approaches the form of a conventional sweep which is commonly used in cultivating. The earth working tool 21 has an integral lug 21a formed on the forward apex thereof in which there is provided a vertically disposed hole 21b which permits mounting such tool in clevis 16 as described for earth working tool 20. It will be appreciated that this invention is not limited to the particular shape or configuration of the earth working element that can be mounted on bracket 14. However, the preferred shapes of the earth working element are shown on the appended drawing. In either case the earth working element is trailingly secured to the supporting tine by pivotal connections permitting free movement of the attached tool in vertical and lateral or transverse planes.

When utilizing the earth working tool 20, such tool performs best for severing the roots of weeds below the surface of the soil in cultivating or for breaking the plow pan or subsoil when working at a greater depth than for cultivating. The vertical pivot axis provided by bolt 19 permits tool 20 to freely swing from side to side as either of the blades 20a encounters a stone or other obstruction in the soil. Hence, the straight line, uniform depth forward progress of the implement to which this tool is attached will be relatively unimpeded. In the event that an obstruction in the soil tends to produce a vertical deflection of tool 20, the tool 20 will ride either up or down to pass such obstruction through the horizontal pivotal connection thereof to pin 15. Except when encountering obstructions, the normal soil reaction on tool 20 will cause tool 20 to trail smoothly behind tine 10. However, as stated above, in the event an obstruction is encountered in the ground, the tool 20 will readily pass around such obstruction with a minimum of disturbance to the implement.

When utilizing the form of earth working tool 21, such tool is primarily used for shallow surface cultivation and the vertical and horizontal freely swinging movements greatly facilitate the cultivation of the crop rows inasmuch as this type of earth working tool will more accurately trail behind the tine of the implement.

From the above description, it is clearly apparent that there is here provided an improved earth working tool which can be attached to any suitable implement such as a cultivator, spring tooth harrow, or a plow beam for surface cultivation of crops, for subsurface cultivation, or for breaking up the plow pan below the top soil. It is further pointed out that this improved earth working tool can be readily moved through obstruction filled soil, such as stony ground, with but a minimum of interference with the implement on which such tools are mounted, as these improved earth working tools will conveniently swing from side to side, or vertically, to avoid such obstructions. It will also be apparent that these earth working tools can be used singly or in any combination to suit the particular crop tillage or cultivating needs.

It will, of course, be understood that various details of construction may be varied through a wide range without departing from the principles of this invention and it is, therefore, not the purpose to limit the patent granted hereon otherwise than necessitated by the scope of the appended claim.

We claim:

In an implement having a depending tool standard, an earth working tool having forwardly converging cutting edges, means defining a vertical axis bearing hole disposed adjacent the vertex of said forwardly converging cutting edges, a bearing pin traversing said bearing hole, a clevis member supporting said bearing pin, said clevis member defining a horizontal axis bearing aperture, a bracket attachable to said tool standard, a horizontal pivot pin supported by said bracket at a position rearwardly of said tool standard and traversing said horizontal axis bearing aperture, whereby said tool is trailingly and swivelly supported relative to said tool standard for pivotal movements in both vertical and horizontal planes.

References Cited in the file of this patent

UNITED STATES PATENTS

| Number | Name | Date |
|---|---|---|
| 308,694 | Pates | Dec. 2, 1884 |
| 311,645 | Cracraft | Feb. 3, 1885 |
| 400,467 | Lynch | Apr. 2, 1889 |
| 751,369 | Ansley | Feb. 2, 1904 |
| 881,340 | Raiford | Mar. 10, 1908 |
| 997,384 | Fowler | July 11, 1911 |
| 1,256,090 | Adkins | Feb. 12, 1918 |
| 1,686,961 | Davenport | Oct. 9, 1928 |
| 2,371,718 | Speck | Mar. 20, 1945 |
| 2,396,132 | Shaffer | Mar. 5, 1946 |